3,136,735
ADDITION OF CARBONAMIDES TO POLYETHYLENE TO INCREASE ABRASION RESISTANCE
Louis L. Stott, Wyomissing, Pa., assignor to The Polymer Corporation, a corporation of Pennsylvania
No Drawing. Filed Oct. 2, 1957, Ser. No. 688,102
8 Claims. (Cl. 260—45.5)

This invention relates to abrasion resistant materials and articles, and more particularly to such materials and articles which are mainly composed of a polymer of ethylene, and even more particularly to polyethylenes which employ a finely divided high molecular weight synthetic linear polyamide as a filler to improve the abrasion resistant qualities.

This patent application is a continuation-in-part of my prior United States application Serial No. 527,155 filed August 8, 1955, now abandoned.

The utility of the many materials which are presently commonly referred to as plastics, and particularly those classifiable as synthetic resins, is very well known. Perhaps the most outstanding feature of the synthetic resin plastic materials, such as polyethylene, is that they are easily and simply formed into desired shapes while in the plastic state. Furthermore, the ease of forming such articles is enhanced when the melting or softening temperature is reasonably low. The utility of these articles after hardening may be limited by a number of factors. Among the most important of these is lack of sufficient resistance to mechanical abrasion and wear for certain purposes such as for bearings, cams, gears, and other similar articles. This deficiency results in excessive wear when these plastic materials are employed for articles used for such purposes.

Accordingly, it is one important object of the present invention to provide synthetic resin plastic materials and articles having improved abrasion resistant characteristics and improved resistance to mechanical wear.

There are a number of synthetic resin materials having relatively low melting or softening temperatures such as polyethylene, for instance, in which the mechanical wear resistance properties are relatively poor, although the other properties possessed by these materials may be very desirable for many purposes.

Accordingly, a further object of this invention is the improvement of the abrasion resistance and wear characteristics of low-melting synthetic resin materials, such as polyethylene, in which these properties are normally relatively poor.

Other objects and advantages of this invention will be apparent from the following specification.

In carrying out the above objects of the present invention in a preferred form thereof, a minor percentage of solvent-resistant nylon powder in finely divided particle form is added and intimately mixed into a synthetic resin material as a filler. The synthetic resin has a melting or softening phase below that of the nylon. The mixture may be fabricated by any one of a number of known methods into articles or coatings for articles. Fabrication methods may include, for instance, injection molding and extrusion.

As used in this specification, the term "nylon" refers to synthetic linear polyamides of the type described in United States Patents 2,071,250 issued February 16, 1937, 2,071,253 issued February 16, 1937, and 2,130,948 issued September 20, 1938. All three of these patents were issued in the name of Wallace H. Carothers, as inventor. The polymers there described are high molecular weight products which generally can be obtained crystalline in structure, as evidenced by X-ray powder diffraction patterns of the polymers in the massive state.

The polyamides of the present type, generally speaking, comprise the reaction product of a linear polymer-forming composition, for example, one consisting essentially of a bifunctional reacting material, which comprises in substantial amount molecules containing two amide-forming groups each of which is complementary to an amide-forming group in other molecules in said composition.

These polyamides as described above, or as otherwise identified hereafter, can be obtained, for example, by self-polymerization of monoaminomono carboxylic acid, or by reacting a diamine with a dibasic carboxylic acid in substantially equimolecular amounts, it being understood that reference herein to the amino acids, diamines and dicarboxylic acids is intended to include the equivalent amide-forming derivatives of these reactants.

These linear polyamides include also polymers obtained by admixture of other linear polymer-forming reactants. In the simple polyamides the average number of carbon atoms separating the amide group is at least two. On hydrolysis with hydrochloric acid, the amino acid polymers yield the amino acid hydrochloride, and the diamine-dibasic acid polymers yield the diamine hydrochloride and the dibasic carboxylic acid. In any case, the polyamides employed in this invention are limited to those which are soluble in phenol at room temperature and are insoluble in ethylene glycol except at temperatures above about 150° C. Mixtures of two or more polyamides which meet the requirements set forth are also suitable for the practice of this invention.

For the sake of simplicity, the linear polyamides or mixtures thereof described above will be referred to herein as nylon. The term "nylon," as used in this specification, is intended to be limited to the materials as described and defined above. In order to emphasize the solubility characteristics specified above, these materials may also be referred to herein as solvent resistant nylon. Representative materials in this category which are thought to be particularly useful in the practice of the present invention are polyhexamethylene adipamide, polyhexamethylene sebacamide, and polycaprolactam.

Although some of the advantages of this invention may be obtained with larger particles of nylon, a better dispersion of the nylon filler particles is obtained throughout the filled material and superior results are obtainable, in accordance with the present invention, by the use of very fine nylon filler particles, and preferably particles having an average ultimate size of 40 microns or less. Such particles are preferably produced by solution and precipitation processes such as described in United States Patent 2,592,616 issued April 14, 1952, and Patent 2,639,278 issued May 19, 1953, and Patent 2,742,440 issued April 17, 1956, all of which are in the names of Louis L. Stott and Laurence R. B. Hervey. In accordance with a preferred process for the production of the particles as described and claimed, for instance, in Patent 2,639,278, the nylon is dissolved in a polyhydric alcohol by heating a mixture of the nylon and alcohol to a sufficient temperature to dissolve the nylon. The solution is then cooled to precipitate the nylon as a finely divided powder and the solvent is removed and the powder is dried. When superior results are desired, the nylon may be ground, as in a liquid nitrogen grinding hammer mill, to break up any agglomerates of the ultimate particles to achieve an actual particle size averaging 20 microns or less.

It is also very desirable to exercise precautions to exclude moisture from the materials, and particularly the finely divided nylon. This can be done by conventional drying procedures applied to the nylon before blending, or to the powder composition, after blending. In any case, the material should be dried before molding or forming into the final solid article.

This invention relates particularly to the addition of finely divided nylon to synthetic resin materials having melting or softening temperatures during processing which are below the melting temperature of the nylon material which is being used. These synthetic resins will be referred to, therefore, as binders, and the nylon, as a filler.

One material which has proven to be particularly desirable as a binder in the practice of this invention is polyethylene. It is well known that polyethylene has many properties which are desirable for specialized purposes, such as flexibility, toughness, and chemical inertness. However, the mechanical abrasion resistance is not as high as desired for some purposes and it has been discovered that the addition of even a small amount such as 5 percent of finely divided nylon to polyethylene will improve the wear resistance to a very striking degree. This result is illustrated by examples which are given below. It will be understood that all of the examples are given by way of illustration only and should not be interpreted as limiting the invention.

*Examples 1 to 4.—Polyethylene and Polyethylene Filled With Finely Divided Nylon*

In these examples, a polyethylene was used which is believed to have a molecular weight between 25,000 to 30,000 and a density, expressed in terms of specific gravity, of 0.914. This powdered material was liquid nitrogen ground through a small size hammer mill. In examples 2 to 4 finely divided nylon consisting of polyhexamethylene adipamide particles having an actual size averaging about 20 microns in the proportions shown below was added. Each of the mixtures was mixed and blended for 20 minutes in a cone blender. After vacuum drying for 48 hours at 120° F., the materials of each example were formed into a strip form by a melting and extrusion-like process between rollers, producing a strip approximately .050 inch in thickness. The equipment used for this extrusion process was similar to that disclosed in the following patents: 2,624,913 issued January 13, 1953, in the names of Eugene E. Montross and Paul L. Shurr, and 2,627,085 issued February 3, 1953, in the name of Robert C. Rahm.

The samples were each tested for wear characteristics in a wear testing machine, employing a rotating plate pressed against the surface of the material through a lever system applying a force of 17½ lbs. and rotating at a continuous speed of 620 r.p.m. This plate was in the form of a round, flat disk having an open center 21/64 inch in diameter. The outside diameter of the wear plate surface was ¾ inch in diameter and the specification for the surface finish of the wear plate is 3 to 5 microinches root mean square. On each sample, the wear test was continued for three hours and the thickness of the material which was worn away on each sample is given in the following table as "wear in inches." The measured coefficient of friction is also shown in this table.

obtained with 25 percent nylon are approximately 32 times better than the polyethylene with no nylon added.

Unfortunately, the higher the percentage of nylon becomes, the more difficult it is to fabricate the material. Thus, it was discovered that on Example 4 with 25 percent nylon, the strip forming process used for these samples was rather difficult and perhaps would not be practical for commercial production. It is realized, of course, that other methods of fabrication might be employed successfully for this material, as well as for materials with even higher percentages of nylon filler.

It will also be seen from the strength measurements given in the above table that the strength of the material is impaired somewhat as additional proportions of nylon filler are added.

It appears from this series of tests, however, that approximately a 10 percent of finely divided nylon filler content is a good compromise composition to achieve a significant improvement in wear resistance without unduly impairing the fabrication and strength characteristics of the filled material. Accordingly, in subsequent tests, a 10 percent composition of finely divided nylon was employed.

In an attempt to obtain improved results, in the following examples a more elaborate mixing procedure was employed in the preparation of the powder from which the sample articles were produced.

*Example 5*

Ten parts of finely divided nylon (actual particle size averaging below 20 microns) were dried from eight to ten hours at 120° F. and then thoroughly mixed with 90 parts of polyethylene having a molecular weight which is believed to be in the range from 25,000 to 30,000 and having a density of 0.923 expressed in terms of specific gravity. The mixing was accomplished by working the material for from ten to fourteen minutes in a small laboratory size Banbury mill which will handle a 4-lb. or 5-lb. batch of material. This mill is of a standard design which is commonly used in the rubber industry having two oppositely rotating spiral blades which rotate in an interlocking relationship, the outer periphery of the blades having a narrow clearance with the inner walls of the container which surrounds them. The material was next processed for two or three minutes in a two-roll mill of the type employing different speeds on the two rolls in order to work the material. This material was then removed from the two-roll mill in a slab form, allowed to cool and ground into a granular form. A molded slab sample of the material was then prepared in a small laboratory press at a temperature of approximately 320° F. and a pressure of approximately 5,000 lbs. per square inch.

This sample was then subjected to the same wear test described in connection with Examples 1 to 4 and after

| Example number | Finely divided nylon, percent | After 3 hours of testing | | Strength measurements | | | |
|---|---|---|---|---|---|---|---|
| | | Coefficient of friction | Wear in inches | Percent elongation | Tensile strength | Shear strength | Durometer type "D" hardness |
| 1 | 0 | .291 | .0320 | 379 | 1,905 | 8,811 | 45 |
| 2 | 5 | .233 | .0041 | 266 | 1,486 | 8,085 | 45 |
| 3 | 10 | .211 | .0030 | 218 | 1,293 | 7,260 | 45 |
| 4 | 25 | .174 | .0010 | 58 | 1,338 | 7,385 | +40 |

It is to be seen from the results given in the above table that when only 5 percent of finely divided nylon was added to the material of Example 2, the wear characteristic was improved by approximately 8 times as compared to Example 1 in which no nylon was added. Similarly, it is to be seen from the results of Examples 3 and 4 that the higher the percentage of nylon, the greater the improvement in wear resistance characteristics. Thus, the results three hours of testing, the wear in inches, that is, the thickness of the material worn away, was found to be .0010 inch, and the coefficient of friction .106. The results of this test show that with a more elaborate mixing procedure, wear resistance results are obtainable with only 10 percent of finely divided nylon which are comparable to the results obtained in Example 4 with 25 percent nylon.

Example 6

A procedure exactly as described for Example 5 was followed, using the same materials, with the exception that instead of cooling the material in slab form as it came from the two-roll mill and grinding it into a granular form, the material was fed from the two-roll mill into an extruder and the material which was thus extruded was cut into pellets having a maximum dimension of approximately ⅛ of an inch. The material in this pelletized form was then shaped into a slab as described for Example 5. The wear test results on this example were as follows: Wear in inches .0006 and coefficient of friction .155. Apparently the pelletizing step provided a further improvement in the wear resistant qualities of the product.

Example 7

Exactly the same procedure was followed in the preparation of this sample as in the preparation of Example 6, using the same materials, with the exception that the pelletized material was formed into a sample test piece .050 inch in thickness by the extrusion technique described for Examples 1 to 4. The wear test results for this sample were as follows: Wear in inches .001, coefficient of friction .106.

It is to be seen from the above series of examples which relate to the addition of finely divided nylon to polyethylene that by careful and thorough blending of the mixture, with only a 10 percent nylon filler, the wear resistance of the polyethylene apparently is increased by more than 30 times.

It will be seen from the above disclosure that this invention provides a truly remarkable and unexpected degree of improvement in abrasion resistance with the addition of only minor amounts of nylon filler.

One of the most unusual features of this invention is the fact that the finely divided nylon which improves the abrasion resistance is not itself an abrasive, as might be expected.

Other fillers, such as wood flour, for instance, may be added to the synthetic resin compositions of this invention, in addition to the finely divided nylon, without seriously impairing the qualities of the product.

Mixtures of two or more of the various nylon materials described above may be used advantageously as the nylon filler material in the practice of this invention.

The following claims are intended to define the valid scope of this invention over the prior art and to cover all changes and modifications falling within the true spirit and valid scope of the invention.

I claim:

1. A composition for use in forming abrasion resistant articles comprising a mixture of a finely divided synthetic linear polymeric carbonamide which contains recurring carbonamide groups as an integral part of the main polymer chain separated by at least two carbon atoms and polyethylene, the composition containing a sufficient amount of the carbonamide to materially increase the abrasion resistance of an article formed from the composition as compared to an article formed from polyethylene, but not more than about 25% by weight of said mixture.

2. A composition of claim 1 containing an amount of carbonamide not more than about 10% by weight of said mixture.

3. A composition of claim 1 in which the carbonamide is polyhexamethylene adipamide.

4. A composition as defined in claim 1 in which the carbonamide is polyhexamethylene sebacamide.

5. A composition as defined in claim 1 in which the carbonamide is polycaprolactam.

6. An abrasion resistant article comprising a mixture of a synthetic linear polymeric carbonamide which contains recurring carbonamide groups as an integral part of the main polymer chain separated by at least two carbon atoms and polyethylene, said mixture containing a sufficient amount of carbonamide to materially increase the abrasion resistance of the article as compared to the abrasion resistance of polyethylene, but not more than about 25% by weight of said mixture.

7. An abrasion resistant article as defined in claim 6 in which the carbonamide is polyhexamethylene sebacamide.

8. An abrasion resistant article as defined in claim 6 in which the carbonamide is polycaprolactam.

References Cited in the file of this patent

UNITED STATES PATENTS

| | | |
|---|---|---|
| 2,302,332 | Leekley | Nov. 17, 1942 |
| 2,542,771 | Hanford et al. | Feb. 20, 1951 |
| 2,695,425 | Stott | Nov. 30, 1954 |
| 2,975,128 | Stott | Mar. 14, 1961 |

OTHER REFERENCES

Dickinson: "Sprayed Plastics Coatings," British Plastics, May 1954, pages 171–175.